Sept. 1, 1925.
J. D. COBB
RADIUS ROD CLAMP
Filed Oct. 20, 1923
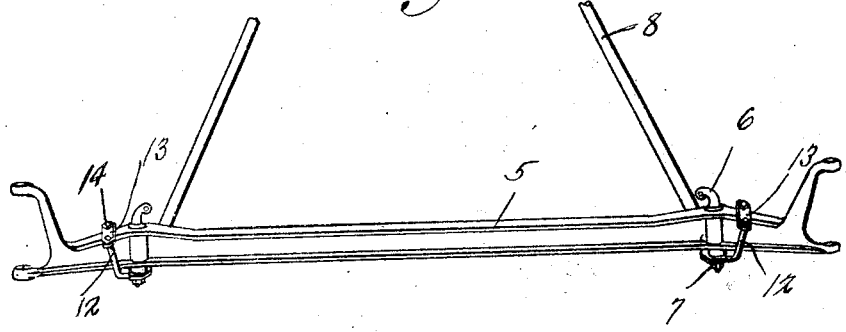
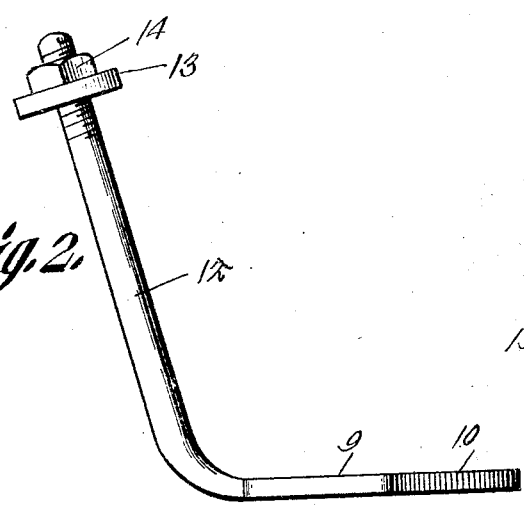
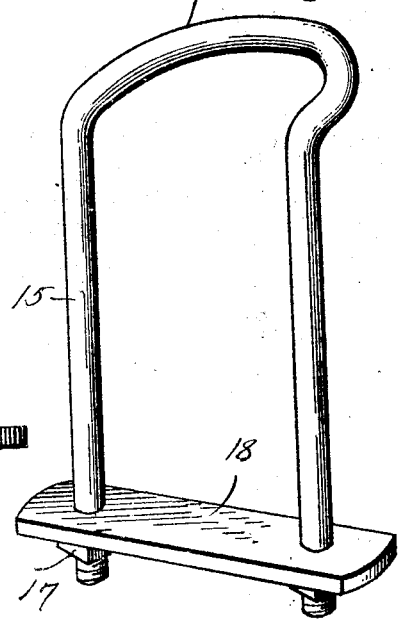
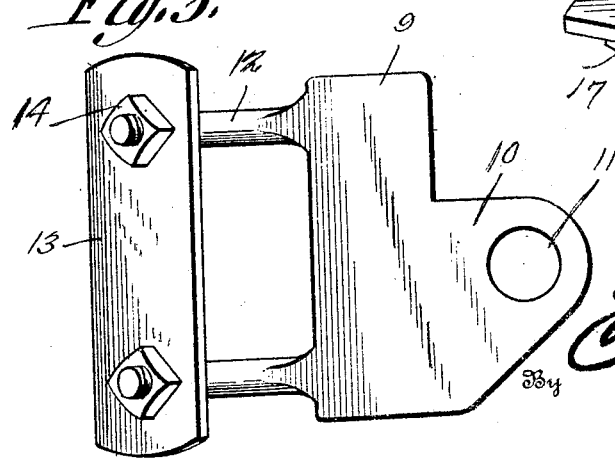

Patented Sept. 1, 1925.

1,552,115

UNITED STATES PATENT OFFICE.

JAMES D. COBB, OF LATTA, SOUTH CAROLINA.

RADIUS-ROD CLAMP.

Application filed October 20, 1923. Serial No. 669,850.

*To all whom it may concern:*

Be it known that I, JAMES D. COBB, a citizen of the United States, residing at Latta, in the county of Dillon and State of South Carolina, have invented a new and useful Radius-Rod Clamp, of which the following is a specification.

This invention has reference to a device especially designed for use in connection with radius rods and the axle to which the radius rods are connected.

The primary object of the invention is to provide a clamp which may be readily and easily applied, the clamp being especially constructed to support and brace one end of the radius rods should the nut usually employed for securing the radius rods, become loosened or lost.

Another important object of the invention is to provide means to insure against rattling of a radius rod at its point of connection with the axle, should the securing nuts become loosened.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is an elevational view disclosing the application of the device.

Figure 2 is a side elevational view of the preferred embodiment of the invention.

Figure 3 is a plan view thereof.

Figure 4 is a perspective view of a modified form of clamp.

Referring to the drawing in detail, the reference character 5 indicates the front axle of a motor vehicle which is supplied with the usual spring perches 6 that extend through openings in the axle, the lower threaded ends thereof receiving the securing nut 7 and forward ends of the radius rods 8 that are formed with openings to receive the threaded end of the perches 6.

The clamp forming the essence of the invention includes a body portion 9 which is formed with an extension 10 provided with an opening 11 to accommodate the threaded extension of a perch. Formed integral with the body portion 9 are spaced parallel arms 12 that extend upwardly at angles with respect to the body portion 9 as clearly shown by Figure 2 of the drawing.

Connecting the free ends of the arms 12 is a plate 13 formed with openings to receive the arms 12, nuts 14 being positioned on the threaded ends of the arms 12 to hold the plate 13 in position. In the use of the clamp the radius rods are positioned on the threaded ends of the perches, whereupon the body portion 9 is positioned thereover. The usual securing nut is now positioned on the threaded end of the perch iron associated therewith to force the body portion 9 into close engagement with the radius rod associated therewith.

It will be obvious that with the clamp in this position, the plate 13 may be positioned over the axle in a manner to connect the threaded ends of the arms to secure the the clamp in position.

Should the usual securing nut become loosened or lost from the threaded end of the perch, it will be seen that the clamp will act as a support for the radius rod to hold the radius rod in its proper position with respect to the axle. In the modified form of the invention as illustrated by Figure 4 of the drawing, the clamp is inverted U-shaped including a pair of arms 15 that are connected by means of the curved portions 16 extending at right angles thereto.

The free ends of the arms 15 are also threaded to receive nuts 17 to secure the plate 18 in position on the arms 15.

In the use of the invention as shown by Figure 4 of the drawing, the curved portion 16 of the clamp is fitted around the perch iron associated therewith the ends of the arms 15 lying in planes in spaced relation with the lower edge of the axle to accommodate the plate 18 which engages the radius rod associated therewith and acts as a support for the same holding the radius rod in close engagement with the axle.

I claim:—

1. In a clamp of the class described, a body portion, a pair of spaced parallel arms extending upwardly from the body portion, said body portion having an opening to receive the threaded end of a perch iron, and a plate removably secured to the arms and adapted to engage the axle supporting the same, and means for forcing the body portion and plate towards the axle.

2. In a clamp of the class described, a relatively flat body portion having an extension formed with an opening, pairs of spaced parallel arms extending from one edge of the body portion and disposed upwardly, said opening adapted to receive a threaded end of a perch iron, said spaced arms adapted to engage the side edges of an axle, and means for connecting the free ends of the arms.

In testimony that I claim the foregoing as my own, I have hereto affixed my signature.

JAMES D. COBB